US007724294B2

United States Patent
Ahn et al.

(10) Patent No.: US 7,724,294 B2
(45) Date of Patent: May 25, 2010

(54) SUB-SAMPLING WITH HIGHER DISPLAY QUALITY IN IMAGE-SENSING DEVICE

(75) Inventors: Jung-Chak Ahn, Suwon-si (KR); Su-Hun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1004 days.

(21) Appl. No.: 11/035,007

(22) Filed: Jan. 12, 2005

(65) Prior Publication Data

US 2005/0174454 A1 Aug. 11, 2005

(30) Foreign Application Priority Data

Feb. 11, 2004 (KR) .................... 10-2004-0008926

(51) Int. Cl.
*H04N 5/335* (2006.01)
(52) U.S. Cl. .................. 348/308; 348/294; 348/307
(58) Field of Classification Search .............. 348/271, 348/294–332; 382/275; 250/208.1; 358/483
See application file for complete search history.

(56) References Cited

U.S. PATENT DOCUMENTS

| | | | | |
|---|---|---|---|---|
| 5,982,318 | A | 11/1999 | Yiannoulos | 341/155 |
| 6,061,093 | A * | 5/2000 | Yonemoto | 348/305 |
| 6,067,113 | A * | 5/2000 | Hurwitz et al. | 348/241 |
| 6,437,307 | B1 * | 8/2002 | Bloss et al. | 250/208.1 |
| 6,507,011 | B2 * | 1/2003 | Ang | 250/208.1 |
| 6,807,319 | B2 * | 10/2004 | Kovvuri et al. | 382/275 |
| 6,842,192 | B1 * | 1/2005 | Suzuki et al. | 348/308 |
| 6,888,568 | B1 * | 5/2005 | Neter | 348/222.1 |
| 6,956,605 | B1 * | 10/2005 | Hashimoto | 348/301 |
| 6,999,120 | B1 * | 2/2006 | Egawa et al. | 348/296 |
| 7,002,713 | B2 * | 2/2006 | Fukawa | 358/483 |
| 7,092,017 | B2 * | 8/2006 | Kelly et al. | 348/241 |
| 7,129,978 | B1 * | 10/2006 | Brehmer et al. | 348/308 |
| 7,129,979 | B1 * | 10/2006 | Lee | 348/308 |
| 7,154,545 | B2 * | 12/2006 | Gann et al. | 348/271 |
| 7,283,167 | B1 * | 10/2007 | Schrey et al. | 348/308 |
| 7,372,490 | B2 * | 5/2008 | Berezin et al. | 348/308 |
| 2001/0010554 | A1 * | 8/2001 | Yoshida | 348/312 |
| 2004/0100436 | A1 * | 5/2004 | Maeda et al. | 345/100 |
| 2004/0141079 | A1 * | 7/2004 | Yamaguchi et al. | 348/308 |
| 2005/0012836 | A1 * | 1/2005 | Guidash | 348/302 |
| 2005/0151866 | A1 * | 7/2005 | Ando et al. | 348/297 |

OTHER PUBLICATIONS

Korean Patent Application No. 1020010044098 to Meados, having Publication date of Feb. 1, 2002 (w/ English Abstract page).
Japanese Patent No. JP2002142155 to Takashi et al., having Publication date of May 17, 2002 (w/ English Abstract page).
Japanese Patent No. JP2003046876 to Hidetoshi, having Publication date of Feb. 5, 2003 (w/ English Abstract page).

* cited by examiner

*Primary Examiner*—Tuan Ho
*Assistant Examiner*—Kent Wang
(74) *Attorney, Agent, or Firm*—Monica H. Choi

(57) ABSTRACT

An image-sensing device includes a driver and an array of pixels. The driver controls the array of pixels to output a combined image signal that is a combination of at least two image signals for at least two aligned pixels in at least two rows, for reducing vertical resolution in the sub-sampling mode. In addition, a mixing circuit further averages the resulting combined signals for M consecutive odd or even columns for reducing horizontal resolution in the sub-sampling mode.

18 Claims, 6 Drawing Sheets

SUB-SAMPLING WITH HIGHER DISPLAY QUALITY IN IMAGE-SENSING DEVICE

BACKGROUND OF THE INVENTION

This application claims priority to Korean Patent Application No. 2004-8926, filed on Feb. 11, 2004, in the Korean Intellectual Property Office, the disclosure of which is incorporated herein in its entirety by reference.

1. Field of the Invention

The present invention relates generally to image-sensing devices, and more particularly, to sub-sampling mode in solid-state image-sensing devices such as of a complementary metal-oxide semiconductor (CMOS) image sensor (CIS)-type.

2. Description of the Related Art

A CIS-type solid-sate image-sensing device is typically used within small portable electronic devices such as a camera of a mobile phone or a digital still camera. The CIS-type solid-state image sensing device converts images into electrical signals for further processing by a digital signal processor. The digital signal processor processes color image data (red, green, and blue signals) output from the solid-state image-sensing device for driving a display device such as a liquid crystal display (LCD).

During a sub-sampling mode of the CIS-type solid-state image-sensing device, a full-frame image signal is generated with lower resolution. The sub-sampling mode is carried out for example in a preview stage in which an image to be sensed is checked before being fully sensed or in an auto focus setting stage with faster signal processing of lower resolution.

FIG. 1 is a block diagram of a conventional CIS-type solid-state image-sensing device 100 that includes an active pixel sensor (APS) array 110, a row driver 120, and an analog-to-digital converter 130. The row driver 120 receives a control signal from a row decoder (not shown), and the analog-to-digital converter 130 receives a control signal from a column decoder (not shown). The solid-state image-sensing device 100 further includes a controller (not shown) that generates addressing signals for controlling timing and selection of pixels for outputting sensed image signals.

When the conventional CIS-type solid-state image-sensing device 100 is for generating colored image signals, a respective color filter is disposed on top of each pixel of the APS array 110. The most common color filter array has a Bayer color pattern in which filters of the colors red (R) and green (G) are alternately disposed on one row and in which filters of the colors G and blue (B) are alternately disposed on the next row. Such a Bayer color pattern is known to one of ordinary skill in the art of image sensing devices.

For high resolution, the APS array 110 includes over a million pixels for example. In the CIS-type solid-state image-sensing device 100, each pixel in the APS array 110 generates a respective image signal by sensing light of the respective color filter with a respective photodiode and converting such light into a respective electrical signal. Thus, the respective image signal output from each pixel of the APS array 110 is an analog signal of one of three colors, R, G, and B. The analog-to-digital converter 130 converts such an analog image signal into a digital signal.

In addition, the analog-to-digital converter 130 uses a correlated double sampling (CDS) method to further process the image signals from the APS array 110. Such a method is described, for example, in U.S. Pat. Nos. 5,982,318 and 6,067,113. For the CDS method, the analog-to-digital conversion is basically divided into two operations: receiving a reset signal and the image signals from the APS array 110, and then processing the reset signal and the image signals to generate digital signals representing the image sensed by the APS array 110.

For the CDS method for example, the analog-to-digital converter 130 subtracts the reset signal from the image signals before conversion into the digital signals. Such digital signals are output to a digital signal processor that may further interpolate the digital image signals. In addition, the digital signal processor generates driving signals appropriate for the resolution of a display device such as a LCD (liquid crystal display).

In a sub-sampling mode of the CIS-type solid-state image-sensing device 100, the image signals are output with lowered resolution. For example, for the APS array 110 having super extended graphics adapter (SXGA) resolution (1280×1024), regular image signals are output at the SXGA resolution. However, for the sub-sampling mode, image signals are output at a video graphics adapter (VGA) resolution (640×480). Also, if the APS array 110 is for ultra extended graphics adaptor (UXGA) resolution (1600×1200), image signals are output with a resolution even lower than the VGA resolution for reducing data processing in the sub-sampling mode.

For sub-sampling mode in the conventional CIS-type solid-state image-sensing device 100, image signals of only a specific row and column that are spaced at a predetermined distance are output to the analog-to-digital converter 130 for lowering the resolution. In the above-mentioned example, to lower the SXGA resolution to the VGA resolution, the image signal from one pixel is selected from among a 2×2 matrix of four pixels for the ½ resolution.

The image signals from the other non-selected pixels are ignored for reduced data processing. With such ignored image signals, a diagonal portion on the display image is not smoothly connected, resulting in aliasing noise that is displayed in a zigzag form.

SUMMARY OF THE INVENTION

Accordingly, an image-sensing device of the present invention processes the image signals from the array of pixels in the sub-sampling mode without ignoring such a substantial portion of the image signals.

In a general embodiment of the present invention, an image-sensing device includes an array of pixels arranged in rows and columns. In addition, the image-sensing device includes a driver that controls the array of pixels to output a combined image signal that is a combination of at least two image signals for at least two aligned pixels of at least two columns or rows having a substantially same color pattern.

In an example embodiment of the present invention, the combined image signal is an average of N image signals for a set of N aligned pixels in N consecutive odd or even rows having a substantially same color pattern. For example, a set of N select transistors corresponding to the N aligned pixels are turned on by the driver for generating the combined signal at a common node of the N select transistors.

In another embodiment of the present invention, the driver controls the array to generate a respective combined image signal for a respective set of N aligned pixels at each column for the N consecutive odd or even rows.

In a further embodiment of the present invention, the image-sensing device includes an analog mixing circuit that further averages the respective combined signals for M consecutive odd or even columns.

In another embodiment of the present invention, the image-sensing device includes an ADC (analog to digital converter) for converting each combined image signal as an analog signal into a digital signal. In that case, a digital mixing circuit further averages the respective combined signals for M consecutive odd or even columns after the respective combined signals are each converted into a respective digital signal.

The present invention is used to particular advantage when the array of pixels has a Bayer color pattern such that the N image signals for the N aligned pixels are for a same color. In an example embodiment of the present invention, the combined signal from the N image signals is generated during a sub-sampling mode.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, and 7 refer to elements having similar structure and/or function.

DETAILED DESCRIPTION OF THE INVENTION

Figure 1:
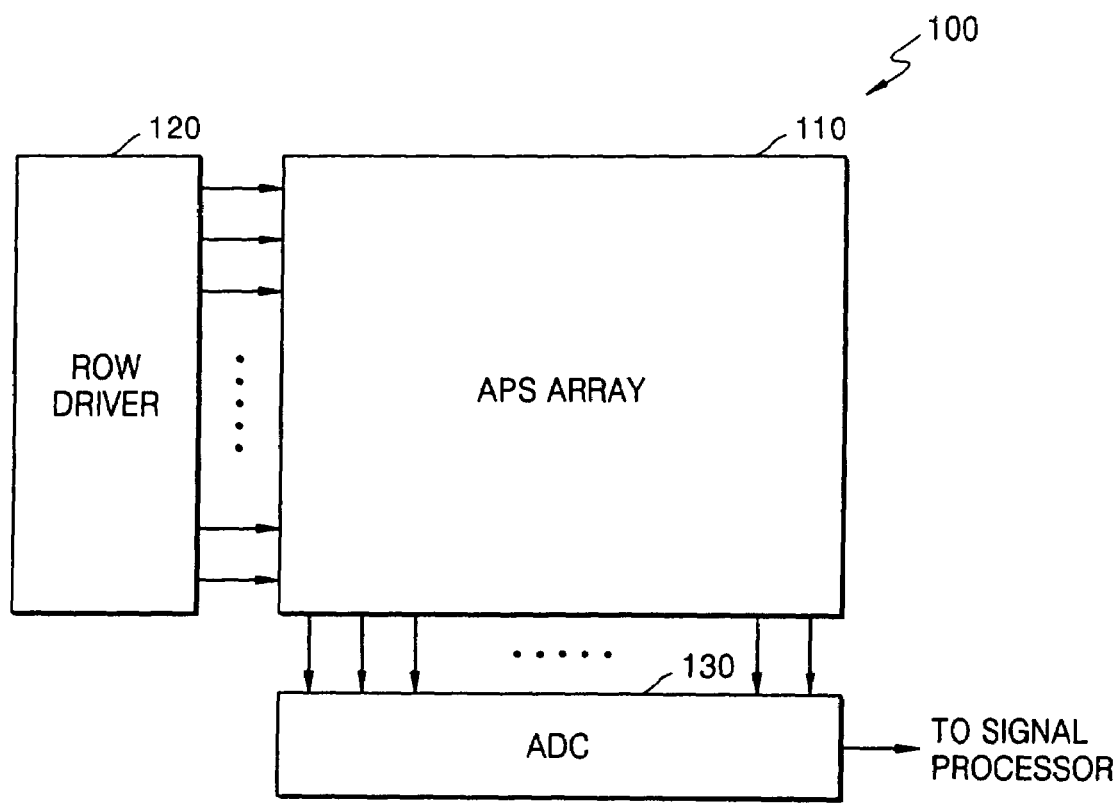
FIG. 1 shows a block diagram of a CIS-type solid-state image-sensing device, according to the prior art.
Figure 2:
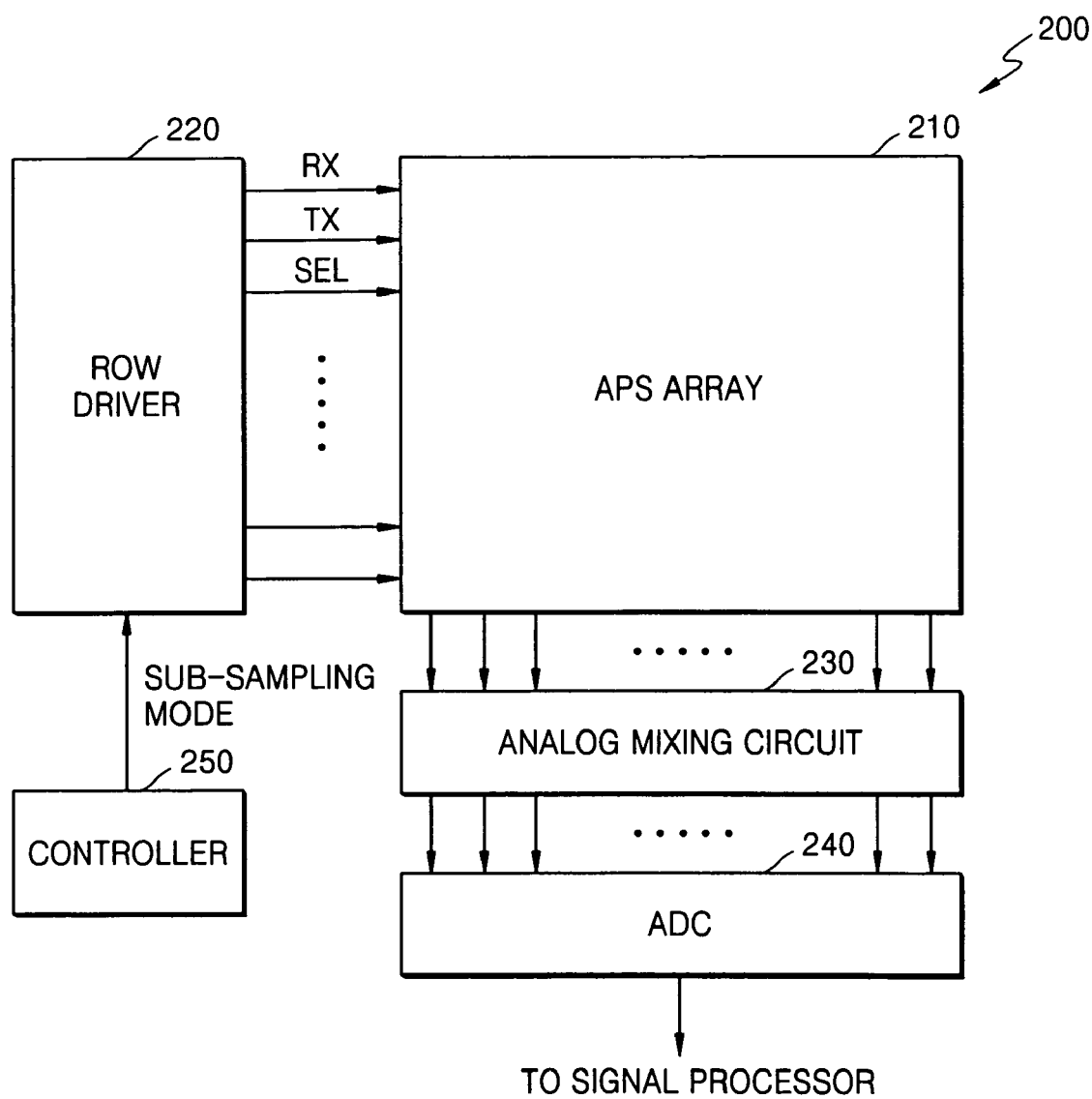
FIG. 2 shows a block diagram of a CIS-type solid-state image-sensing device with an analog mixing circuit, according to an embodiment of the present invention.

FIG. 2 shows a block diagram of a complimentary metal-oxide semiconductor (CMOS) image sensor (CIS)-type solid-state image-sensing device 200 according to an embodiment of the present invention. Referring to FIG. 2, the CIS-type solid-state image-sensing device 200 includes an active pixel sensor (APS) array 210, a row driver 220, an analog mixing circuit 230, an analog-to-digital converter 240, and a controller 250.

The CIS-type solid-state image-sensing device 200 may be mounted within a small portable device such as a camera of a mobile phone or a digital still camera. The solid-state image-sensing device 200 senses light for an image using photodiodes PD and converts the sensed light into electrical signals.

The APS array 210 is comprised of a two-dimensional matrix of pixels arranged in rows and columns. Each pixel has a respective photodiode PD for sensing light at a respective location in the APS array 210 to generate a respective image signal.

The row driver 220 generates a transmission control signal TX, a reset control signal RX, and a row selection signal SEL for controlling output of the image signals from the APS array 210. The image-sensing device 200 generates the three color signals (red (R), green (G), and blue (B)) representing an image, and such color signals are interpolated in an image signal processor for being displayed on a display device such as a liquid crystal display (LCD).

For such a display device, three color signals (R, Gr/Gb, and B) in converted form are used. For generating the converted form of the three color signals (R, Gr/Gb, and B), the Gr and Gb signals are interpolated using second and third color signals (B and R) that are next to a first color signal G in order to compensate for effects of consecutive color signals (R and B) (see FIG. 4). Here, the pixels of the APS array 210 are arranged in a Bayer color pattern. However, the present invention may be practiced for other color filter patterns.

Referring to FIG. 2, the controller 250 sends a control signal indicating that the image-sensing device 200 is to operate in the sub-sampling mode. In such a sub-sampling mode, image signals with lower resolution than the resolution of the pixels in the APS array 210 are output from the image-sensing device 200.

Figure 3:
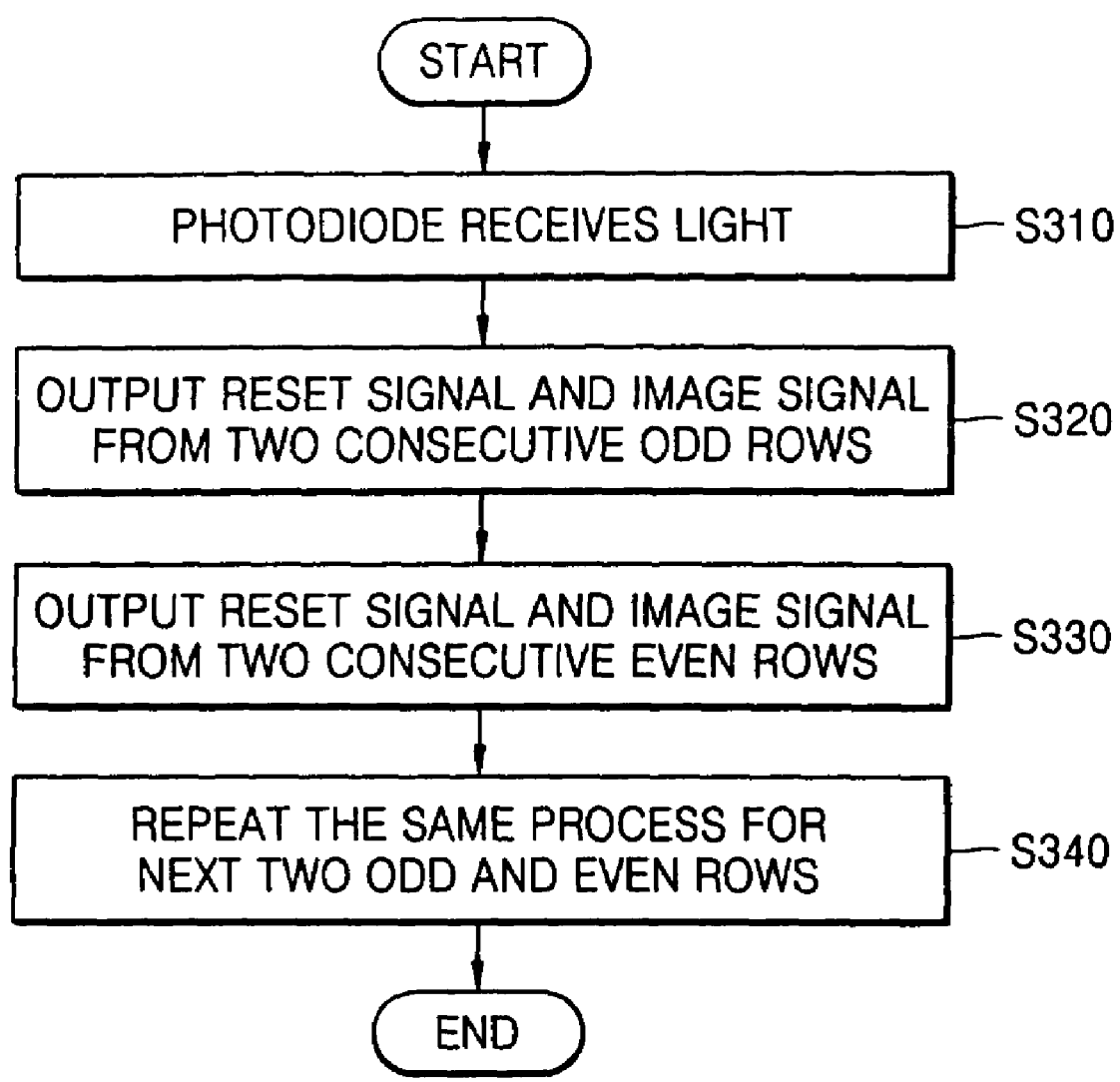
FIG. 3 shows a flow chart of steps during operation of the solid-state image-sensing device of FIG. 2, according to an embodiment of the present invention.
Figure 6:
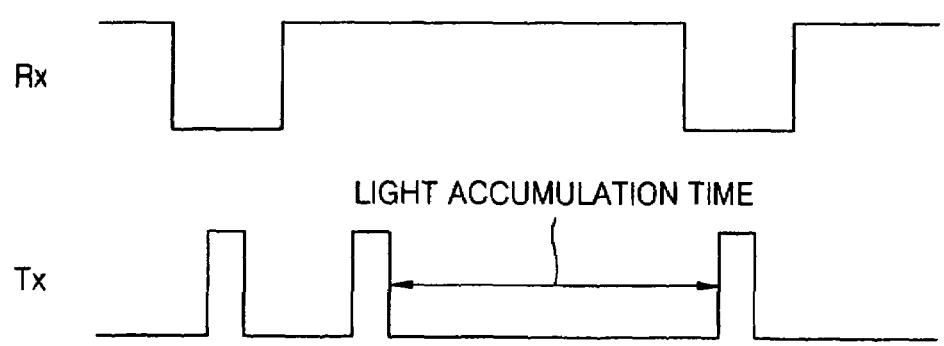
FIG. 6 shows timing diagrams of a reset control signal and a transmission control signal applied on each pixel of FIG. 5, according to an embodiment of the present invention.

FIG. 3 is a flow chart of steps for operation of the image-sensing device 200 of FIG. 2. Here, sub-sampling mode with ½ resolution is described as an example. Referring to FIGS. 2 and 3, signal charges corresponding to an image are accumulated in the photodiodes PD within the APS array 210 for a predetermined time when a mechanical shutter is opened (step S310 of FIG. 3). Referring to FIG. 6, the amount of signal charge accumulated in the photodiodes PD is determined by a transmission control signal TX from the row driver 220.

In addition, the APS array 210 generates a reset signal VRST in response to the reset control signal RX while the signal charge is being accumulated in the photodiodes PD (step S320 of FIG. 3). Moreover, the APS array 210 outputs image signals converted into photoelectrical signals by the photodiodes PD in response to the transmission control signal TX (step S320 of FIG. 3). For the sub-sampling mode, the APS array 210 first averages two image signals from two pixels aligned along a same column for two consecutive odd or even rows to generate a row of combined image signals (step S320 of FIG. 3).

Figure 4:
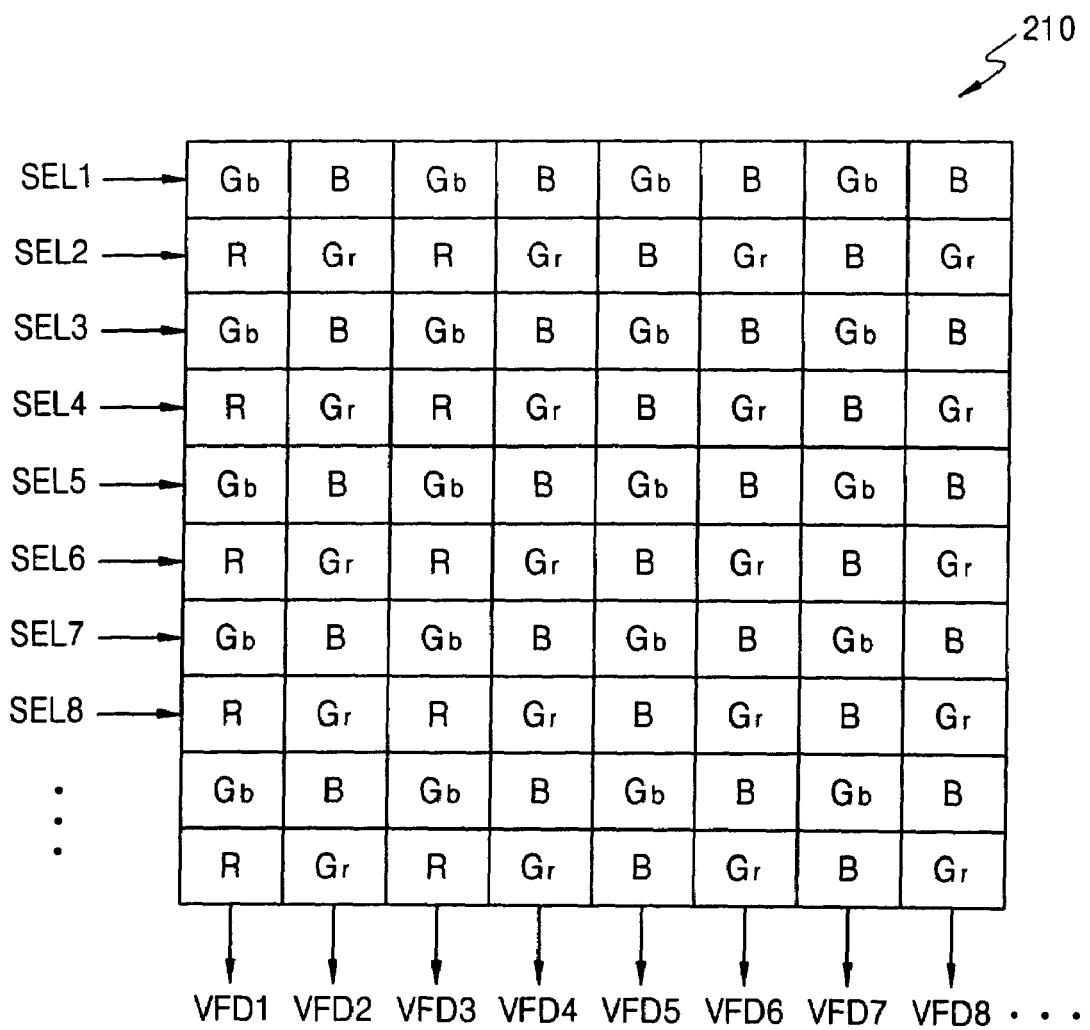
FIG. 4 shows an example color pattern for an active pixel sensor (APS) array of pixels of FIG. 2.

FIG. 4 shows the Bayer pattern of the color filters disposed on the APS array 210 of FIG. 2. Each pixel on the APS array 210 has a respective color filter for a respective one of the three color signals (R, G, and B). Here, the green filter G, which is closely related to the luminance signal, is disposed on all rows. In addition, the red filter R and the blue filter B are alternately arranged as illustrated in FIG. 4 for each row to increase the brightness resolution.

In FIG. 4, Gb denotes a first green signal and Gr denotes a second green signal, both green signals Gb and Gr being generated by an interpolation process in a signal processor disposed after the analog-to-digital converter 240 of FIG. 2. Hereinafter, the green signals Gb and Gr are described as the green color signal G. The row selection signal SEL, the transmission control signal TX, and the reset control signal RX are generated from the row driver 220 and inputted to each pixel of the APS array 210.

Figure 5:
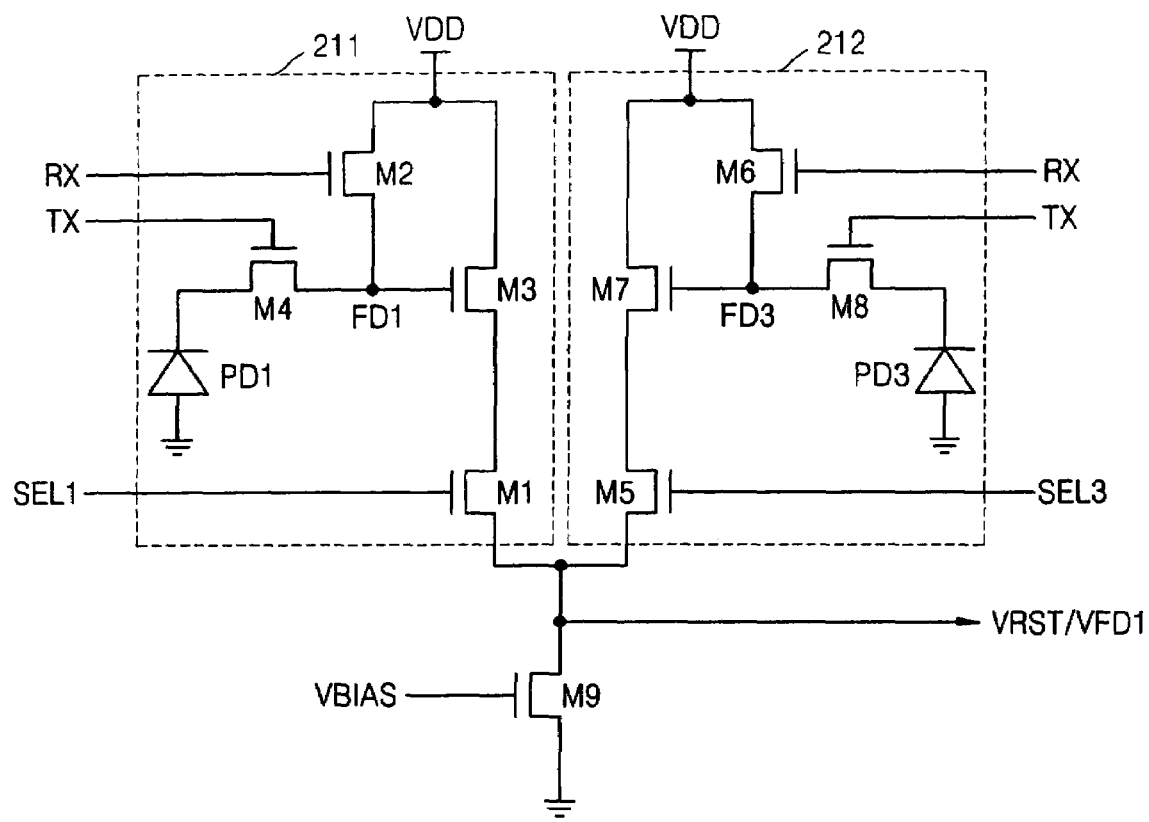
FIG. 5 shows circuit elements of two selected pixels having image signals that are combined, according to an embodiment of the present invention.

FIG. 5 shows circuit elements within two aligned pixels generating image signals that are averaged to generate a combined image signal in the sub-sampling mode. For example, such two aligned pixels 211 and 212 are located in a same column of two consecutive odd rows, e.g., the first and third rows, respectively. The row driver 220 generates a first row selection signal SEL1 and a third row selection signal SEL3 that are activated for such first and third rows.

Further referring to FIG. 5, the two pixels 211 and 212 are coupled at a common node that generates a reset signal VRST or the combined image signal VFD1. Such a common node is coupled to a drain terminal of a metal-oxide semiconductor field-effect transistor (MOSFET) M9. A bias voltage VBIAS is applied on such a MOSFET M9 for forming a bias circuit.

Further referring to FIG. 5, the pixel 211 is comprised of four MOSFETs M1, M2, M3, and M4, and the pixel 212 is comprised of four MOSFETs M5, M6, M7, and M8. When the first and third row selection signals SEL1 and SEL3 and the transmission control signal TX are activated in the sub-sampling mode, the image signals from the photodiodes PD1 and PD3 are transferred to the common node to generate the combined image signal VFD1 with turning on of the MOSFETs M4, M3, M1, M8, M7, and M5. Alternatively, the reset signal VRST is output when the reset control signal RX is activated with turning on of the MOSFETs M2, M3, M1, M6, M7, and M5.

Referring to FIGS. 4 and 5, odd rows such as rows corresponding to the select signals SEL1, SEL3, SEL5, . . . have a same color pattern. Thus, pixels aligned along a same column in such odd rows have a color filter of a same color. Similarly, even rows such as rows corresponding to the select signals SEL2, SEL4, SEL6, . . . have a same color pattern. Thus, pixels aligned along a same column in such even rows have a color filter of a same color.

Generally, referring to FIGS. 2, 3, and 4, the APS array 210 generates a respective combined image signal from averaging the respective N image signals from a set of N pixels aligned along a same column for N odd rows when the respective select signals SEL1, SEL3, SEL5, . . . SELN and the transmission control signal TX are activated high, with N being at least two (step S320 of FIG. 3). Alternatively, the reset signal VRST is output for such a set of N aligned pixels when the reset control signal RX is activated instead (step 320 of FIG. 3).

In addition, the APS array 210 generates a respective combined signal for a respective set of N aligned pixels along each column in the N odd rows (step 320 of FIG. 3), to result in a row of combined signals VFD1, VFD2, VFD3, VFD4, VFD5, VFD6, VFD7, VFD8, . . . . Because the N odd rows have a same color pattern, the N aligned pixels along each column of such N odd rows have a color filter of a same color.

Similarly, the APS array 210 generates a respective combined image signal from averaging the respective N image signals from a set of N pixels aligned along a same column for N even rows when the respective select signals SEL2, SEL4, SEL6, . . . SELN and the transmission control signal TX are activated high, with N being at least two (step S330 of FIG. 3). Alternatively, the reset signal VRST is output for such a set of N aligned pixels when the reset control signal RX is activated instead (step 330 of FIG. 3).

In addition, the APS array 210 generates a respective combined signal for a respective set of N aligned pixels along each column in the N even rows (step 330 of FIG. 3), to result in a row of combined signals VFD1, VFD2, VFD3, VFD4, VFD5, VFD6, VFD7, VFD8, . . . . Because the N even rows have a same color pattern, the N aligned pixels along each column of such N even row have a color filter of a same color. Such a process of combining the N image signals from the N aligned pixels for the N consecutive odd or even rows is repeated for each set of N consecutive odd or even rows for the whole APS array 210 (step S340 of FIG. 3).

The analog mixing circuit 230 of FIG. 2 further averages the row of resulting combined signals in the horizontal direction. For example, the analog mixing circuit 230 averages the combined signals of M consecutive odd or even columns corresponding to the same color within the row of combined signals VFD1, VFD2, VFD3, VFD4, VFD5, VFD6, VFD7, VFD8, . . . . Thus, the horizontal resolution is reduced by a factor of 1/M in the sub-sampling mode.

For example, the analog mixing circuit 230 averages two consecutive odd combined image signals VFD1 and VFD3 (which are analog signals) and outputs such a further averaged signal as further combined signals VFD1 and VFD3 (which are now the same further averaged signal) to the analog-to-digital converter 240. Alternatively, the analog mixing circuit 230 averages two consecutive even combined image signals VFD2 and VFD4 (which are analog signals) and outputs such a further averaged signal as further combined signals VFD2 and VFD4 (which are now the same further averaged signal) to the analog-to-digital converter 240.

The analog-to-digital converter 240 then calculates a difference between each of the further averaged signals from the analog mixing circuit 230 and the reset signal VRST and converts such a difference that is an analog signal into a digital signal. A signal processor receives the respective digital signal generated for each of the further combined signals VFD1, VFD2, VFD3, VFD4, VFD5, VFD6, VFD7, VFD8, . . . . Such a signal processor selects just one of the same digital signals occurring in the M consecutive odd or even columns for further processing.

Steps S310, S320, S330, and S340 of FIG. 3 are repeated for each one-frame unit that displays one image on a display device. Although a sub-sampling mode with the ½ resolution has been described as an example, the present invention may be practiced for ⅓, ¼, or ⅕ resolution when N and M in the above description are 3, 4, or 5, respectively. However, the sub-sampling mode with the ½ resolution advantageously has less circuit complexity.

Figure 7:
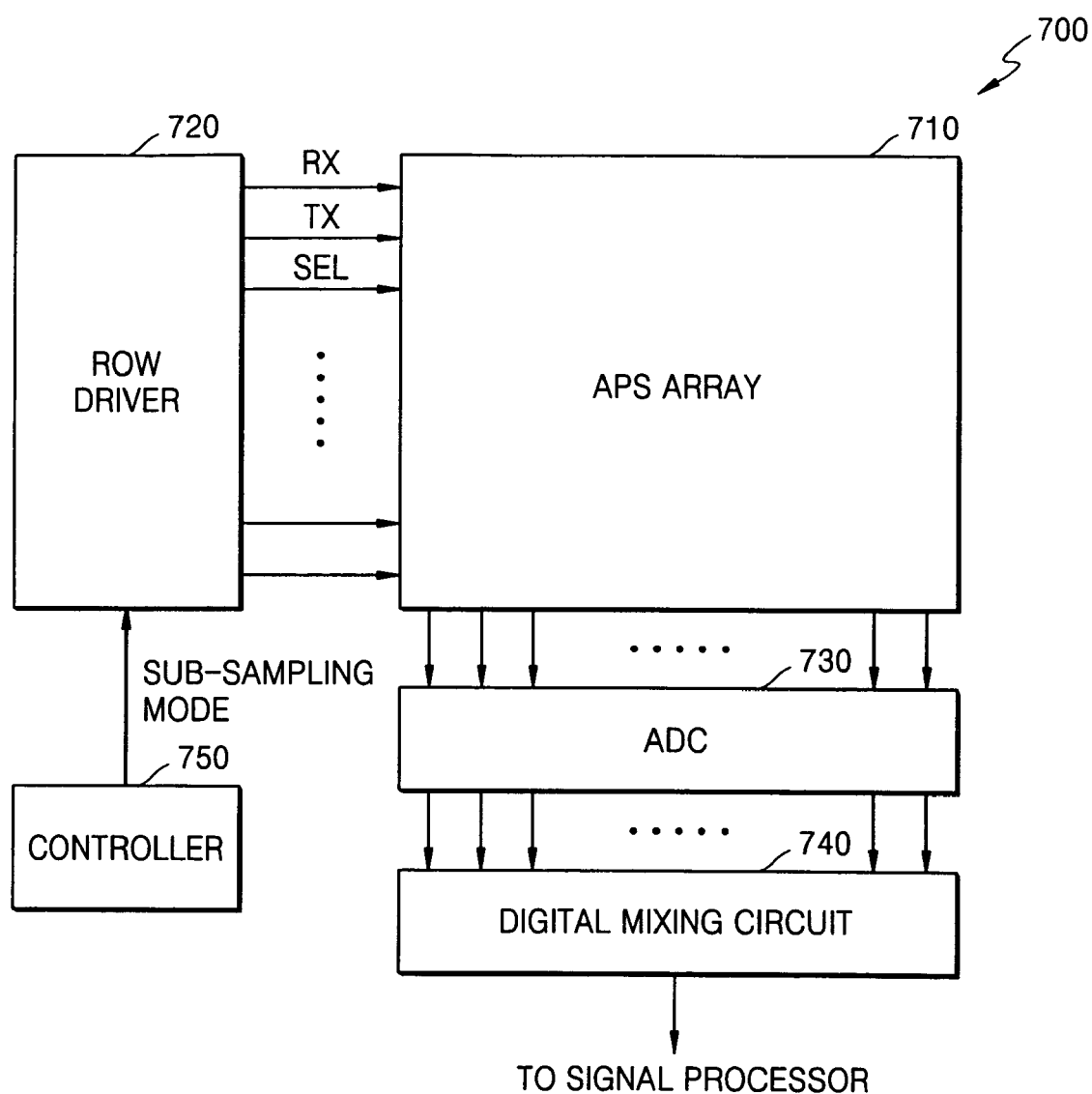
FIG. 7 is a block diagram of a CIS-type solid-state image-sensing device with a digital mixing circuit, according to another embodiment of the present invention.

FIG. 7 is a block diagram of a CIS-type solid-state image-sensing device 700 according to another embodiment of the present invention. Referring to FIG. 7, the CIS-type solid-state image-sensing device 700 includes an APS array 710, a row driver 720, an analog-to-digital converter 730, a digital mixing circuit 740, and a controller 750. The structure and operation of the APS array 710, the row driver 720, and the controller 750 are similar to the structure and operation of the APS array 210, the row driver 220, and the controller 250 of FIG. 2, to generate the combined signals VFD1, VFD2, VFD3, VFD4, VFD5, VFD6, VFD7, VFD8, . . . .

Referring to FIG. 7, the analog-to-digital converter 730 calculates a difference between such combined signals and the reset signal VRST which are analog signals. In addition, the analog-to-digital converter 730 converts such a difference into a digital signal for each of the combined signals VFD1, VFD2, VFD3, VFD4, VFD5, VFD6, VFD7, VFD8, . . . .

Thereafter, the digital mixing circuit 740 further averages the row of resulting digital signals from the analog-to-digital converter 730 in the horizontal direction. For example, the digital mixing circuit 740 averages the digital signals of M consecutive odd or even columns corresponding to the same color within the row of digital signals from the analog-to-digital converter 730. Thus, the horizontal resolution is reduced by a factor of 1/M in the sub-sampling mode. A signal processor selects just one of the same digital signals occurring in the M consecutive odd or even columns that have been averaged for further processing.

In this manner, the image signals from substantially all of the pixels of the APS array 210 of FIG. 2 or 710 of FIG. 7 are used for generating the combined image signals with lower resolution in the sub-sampling mode. By not ignoring the image signals from some of the pixels, the sensed image is displayed with higher quality in such a sub-sampling mode. Such higher display quality is especially advantageous when the image-sensing device 200 or 700 is formed within small portable electronic devices such as a camera of a mobile phone or a digital still camera.

The present invention has been particularly shown and described with reference to exemplary embodiments thereof. It will be understood by those of ordinary skill in the art that various changes in form and details may be made therein without departing from the spirit and scope of the present invention as defined by the following claims.

Thus, the foregoing is by way of example only and is not intended to be limiting. For example, any numbers of elements or circuit topology illustrated and described herein are by way of example only. The present invention is limited only as defined in the following claims and equivalents thereof.

What is claimed is:

1. An image-sensing device comprising:
    an array of pixels arranged in rows and columns;
    a driver that controls the array of pixels to output a combined image signal that is a combination of at least two image signals for at least two aligned pixels in at least two columns or rows having a substantially same color pattern,
    wherein the combined image signal is generated by combining respective electric charges from said pixels in the columns or rows having a substantially same color pattern that are not adjacent columns and are not adjacent rows and without combining respective electric charges from pixels of any adjacent rows and without combining respective electric charges from pixels of any adjacent columns,
    and wherein the combined image signal is generated from the respective electric charges from N of the aligned pixels in N of the odd or even columns or rows having a substantially same color pattern, with N being an integer that is at least two; and
    a set of N select transistors turned on by the driver for transferring the respective electric charges to a common node from said N separate pixels of said N separate odd or even columns or rows to generate said combined signal.

2. The image-sensing device of claim 1, wherein the combined image signal is an average of N image signals from said N aligned pixels in the N consecutive odd or even columns or rows having a substantially same color pattern.

3. The image-sensing device of claim 2, wherein the driver controls the array to generate a respective combined image signal for a respective set of N aligned pixels at each column for the N consecutive odd or even rows.

4. The image-sensing device of claim 3, further comprising:
    an analog mixing circuit that further averages the respective combined signals for M consecutive odd or even columns.

5. The image-sensing device of claim 3, further comprising:
    an ADC (analog to digital converter) for converting each combined image signal as an analog signal into a digital signal.

6. The image-sensing device of claim 5, further comprising:
    a digital mixing circuit that further averages the respective combined signals for M consecutive odd or even columns after the respective combined signals are each converted into a respective digital signal.

7. The image-sensing device of claim 2, wherein the N image signals are for a same color.

8. The image-sensing device of claim 2, wherein the array of pixels has a Bayer color pattern.

9. The image-sensing device of claim 1, wherein the combined signal is generated by the array of pixels for a sub-sampling mode.

10. A method for sensing an image, comprising:
    generating a respective image signal at each pixel of an array of pixels arranged in rows and columns;
    controlling the array of pixels to output a combined image signal that is a combination of at least two image signals for at least two aligned pixels in at least two columns or rows having a substantially same color pattern,
    wherein the combined image signal is generated by combining respective electric charges from said pixels in the columns or rows having a substantially same color pattern that are not adjacent columns and are not adjacent rows and without combining respective electric charges from pixels of any adjacent rows and without combining respective electric charges from pixels of any adjacent columns,
    and wherein the combined image signal is generated from the respective electric charges from N of the aligned pixels in N of the odd or even columns or rows having a substantially same color pattern, with N being an integer that is at least two; and
    turning on a set of N select transistors for transferring the respective electric charges to a common node from said N separate pixels of said N separate odd or even columns or rows to generate said combined signal.

11. The method of claim 10, further comprising:
    generating the combined image signal by averaging N image signals from the N aligned pixels in the N consecutive odd or even columns or rows having a substantially same color pattern.

12. The method of claim 11, further comprising:
    controlling the array to generate a respective combined image signal for a respective set of N aligned pixels at each column for the N consecutive odd or even rows.

13. The method of claim 12, further comprising:
    averaging further the respective combined signals generated as analog signals from the array for M consecutive odd or even columns.

14. The method of claim 12, further comprising:
    converting each combined image signal generated as an analog signal into a digital signal.

15. The method of claim 14, further comprising:
    averaging further the respective combined signals for M consecutive odd or even columns after the respective combined signals are each converted into a respective digital signal.

16. The method of claim 11, wherein the N image signals are for a same color.

17. The method of claim 11, wherein the array of pixels has a Bayer color pattern.

18. The method of claim 10, wherein the combined signal is generated by the array of pixels for a sub-sampling mode.

* * * * *